United States Patent [19]
DiVito

[11] Patent Number: 5,724,840
[45] Date of Patent: Mar. 10, 1998

[54] CAM LOCK

[75] Inventor: Thomas J. DiVito, Southington, Conn.

[73] Assignee: Kaba High Security Locks Corporation, Southington, Conn.

[21] Appl. No.: 620,124

[22] Filed: Mar. 21, 1996

[51] Int. Cl.[6] ............................................. E05B 9/04
[52] U.S. Cl. ............................................. 70/371; 70/379 R
[58] Field of Search ........................ 70/367–373, 379 R, 70/380, 423, 424, 427, 428

[56] References Cited

U.S. PATENT DOCUMENTS

| | | | |
|---|---|---|---|
| 1,689,403 | 10/1928 | Olson | 70/371 |
| 1,821,053 | 9/1931 | Dietz et al. | 70/371 |
| 2,073,109 | 3/1937 | Kirkwood | 70/371 X |
| 2,588,176 | 3/1952 | Strauch | 70/371 |
| 2,641,659 | 6/1953 | Benson | 70/371 X |
| 3,965,707 | 6/1976 | Byars et al. | 70/371 X |
| 4,688,405 | 8/1987 | Epstein | 70/371 X |
| 4,759,204 | 7/1988 | Neyret | 70/369 X |
| 5,010,745 | 4/1991 | Hall et al. | 70/379 R |
| 5,477,711 | 12/1995 | Oliveri | 70/371 X |
| 5,592,837 | 1/1997 | McBride | 70/379 R X |

*Primary Examiner*—Suzanne Dino
*Attorney, Agent, or Firm*—Alix, Yale & Ristas, LLP

[57] ABSTRACT

A removable lock for selectively blocking an aperture in a plate-like member includes a stepped housing which receives a cylinder lock. A rotatable blade, operated by the cylinder lock, is spaced from a shoulder defined by the stopped housing to define a single slot for receiving the plate-like member in the unlocked state of the lock. Rotation of the blade to the locked position results in establishment of a pair of diametrically opposed plate-like member receiving slots.

13 Claims, 4 Drawing Sheets

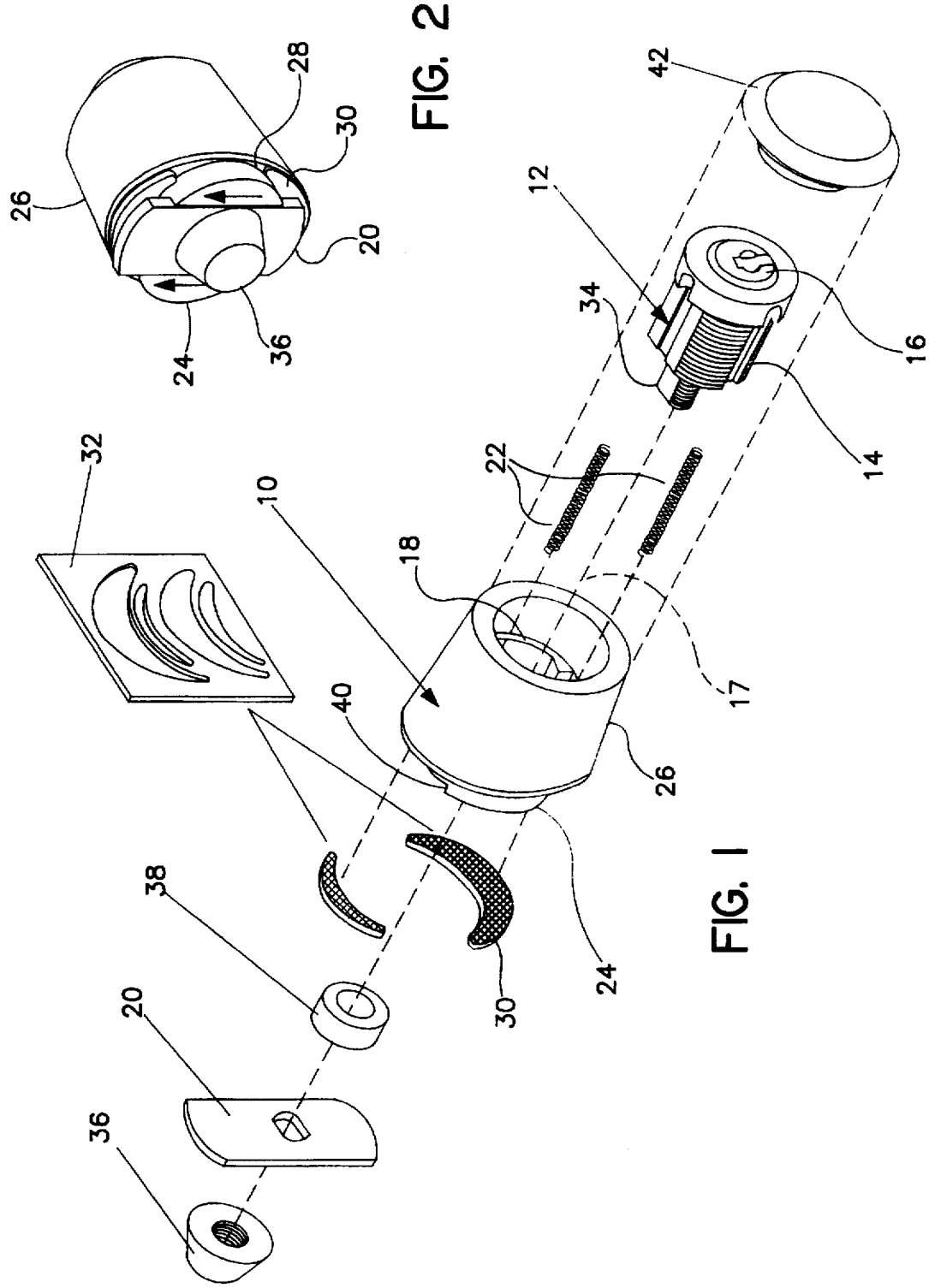

CAM LOCK

BACKGROUND OF THE INVENTION

(1) Field of the Invention

The present invention relates to selectively blocking access to an aperture and, particularly, to the prevention of the manipulation or use of a mechanism which is operable or available through an access aperture provided in the mechanism or in a guard member positioned in front of the mechanism. More specifically, this invention is directed to a removable locking device for insertion in an aperture to be blocked and, especially, to a key operated device having a surface for engaging an apertured member about the first end of an aperture therethrough which is to be blocked and having a cam member for engaging the member at the opposite end of the aperture to be blocked. Accordingly, the general objects of the present invention are to provide novel and improved methods and apparatus of such character.

(2) Description of the Prior Art

Locks with attached cam members are well-known in the art. For example, cylinder lock devices which fill round holes have been used to secure rotary dials on telephones. The cam members on such prior art locks have been round and exactly match the shape of the cylinder plug. Thus, when inserted into a finger hole in a telephone dial, the cam was flush with the circumference of the plug. Rotation of the plug to the locked position resulted in the cam moving to a partially offset position relative to the plug and, in this partially offset position, a portion of the cam lodged behind the dial whereby removal of the lock without damaging the telephone dial was precluded. Such an arrangement is suitable only where the security requirements are rather minimal because the engagement between the cam and back of the dial was only in a single, relatively small area.

In recent years, a demand has arisen for a cam lock which offers a significantly higher degree of security than the prior art locks of the type briefly discussed above. As an example of where such increased security is required, many present day motor vehicles are provided with under-chassis mounted spare tires. Access to a lowering mechanism for such spare tires is via an aperture provided in the vehicle bumper, a crank being inserted through the hole for operation of the lowering mechanism. The theft of such under-chassis mounted spare tires is a problem of increasing magnitude thus precipitating a need for a reliable, secure and sturdy cam lock for selectively blocking, i.e., filling, such crank access apertures.

SUMMARY OF THE INVENTION

The present invention overcomes the above-briefly discussed and other deficiencies and disadvantages of the prior art by providing a novel and improved cam lock characterized by increased security, enhanced reliability and exceptional strength. The present invention also encompasses a method of producing and using such a novel cam lock.

A lock in accordance with the present invention includes a housing which receives a cylinder lock, i.e., a conventional lock having a relatively rotatable shell and plug with such relative rotation being enabled in the conventional manner by the radial displacement of pin tumblers resulting from insertion of a properly bitted key in the keyway provided in the plug. The lock housing is tubular, for accepting the cylinder lock, and has a stepped exterior shape. At the end disposed oppositely with respect to the lock face, i.e., the key insertion end of the plug keyway, the housing is provided with a portion of reduced cross-sectional size which is intended for insertion into the aperture to be blocked. A contact shoulder is defined at the junction of this reduced size housing portion and a forward portion of the housing having a larger cross-section. This contact shoulder thus defines one or more surface areas which contact the face of the apertured member. The smaller cross-sectional portion of the housing is eccentrically related to, i.e., is offset from, the axis of rotation of the cylinder lock plug. A blade-like cam is mounted for rotation with the plug. The blade is elongated and, in the "unlocked" or installation state of the apparatus, extends beyond the portion of the housing having the smaller cross-section, in a direction transverse to the axis of rotation of the plug, on only one side of the housing portion. In the "locked" or installed state of the apparatus, however, the blade extends outwardly beyond both sides of the smaller area housing portion and thus will be located behind the apertured member in two diametrically opposed regions. In accordance with a preferred embodiment, the width of the cam blade is greater than one half of the diameter of a circular cross-sectional small housing portion and thus the areas of engagement with the rearwardly facing side of the apertured member are substantial.

Also in accordance with a preferred embodiment of the invention, the cylinder lock is supported within the housing, with its shell immobilized against rotation, in such a manner that limited reciprocal motion in a direction parallel to the axis of plug rotation is permitted. In such case, the cylinder lock is resiliently biased in the direction of the face of the device. Further, the exposed end of the smaller cross-sectional size portion of the housing is provided with a slot which receives the cam blade with the apparatus in both the locked and unlocked states. In order to permit rotation of the cylinder lock plug, the resilient bias must be overcome in order to disengage the blade from the slot.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the several figures and in which:

FIG. 1 is an exploded perspective view of a cam lock with a two-position locking cam in accordance with the present invention;

FIG. 2 is a perspective assembled view, taken from the rear, of the lock of FIG. 1 in the "locked" state;

DESCRIPTION OF THE DISCLOSED EMBODIMENT

Figure 3A:
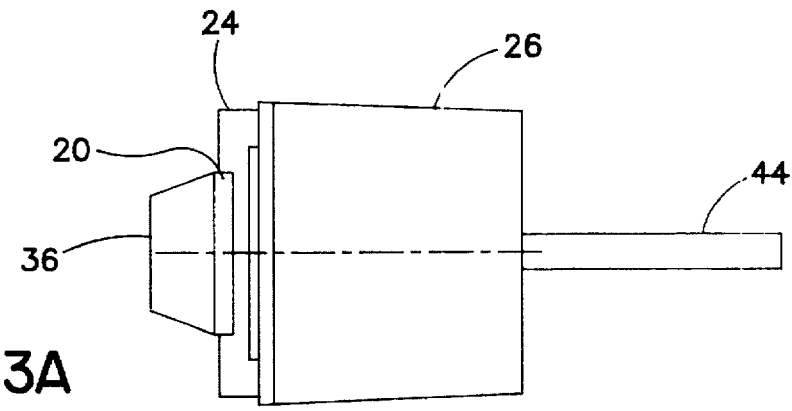
FIGS. 3A, 3B and 3C are, respectively, a top plan view, a rear end view and a cross-sectional side elevation view of the lock of FIGS. 1 and 2 in the "unlocked" state with the key inserted.

With reference now to the drawings, a preferred embodiment of a cam lock in accordance with the present invention, intended for use in blocking a circular crank access aperture in the bumper of a motor vehicle, has been shown. This bumper lock Includes a tubular housing, indicated generally at 10, and a lock, indicated generally at 12. Lock 12 is a conventional cylinder lock having a shell 14, a plug 16 and a plurality of spring loaded pin tumblers which cooperate with chambers in the shell and plug. Plug 16 defines a keyway. Insertion of a properly bitted key into this keyway will displace the pin tumblers radially with respect to the axis of rotation 17 of the plug to a position which will permit relative rotation between the plug and shell. In the disclosed embodiment, cylinder lock 12 has one "locked" position, and the key may be removed only in that position. The interior shape of tubular housing 10 is in part complementary to the exterior shape of cylinder shell 14 whereby, when the cylinder lock is inserted in the housing, relative rotation between cylinder lock 12 and housing 10 is prohibited.

In the disclosed embodiment, the tubular housing 10 and the axis of rotation of plug 16 of cylinder lock 12 are coaxial. Also, cylinder lock 12 is axially movable within the housing 10 between an inwardly or recessed position, defined by a stop shoulder 18, and a normal or outer position defined, in the manner to be described below, by contact between a blade-like cam 20 and a surface on the rear end of housing 10, the rear end being disposed oppositely with respect to the front end which circumscribes the entrance end of the keyway in plug 16. The cylinder lock 12 is biased in the forward direction relative to housing 10, i.e., toward the front of the bumper lock assembly, by a pair of compression springs 22 which are guided in slots extending along the interior of housing 10.

Housing 10 has a stepped configuration which, in the disclosed embodiment, consists of a first or rearwardly disposed portion 24 and a second or forwardly disposed portion 26. The rearwardly disposed portion 24 is sized and shaped to be received in the aperture to be blocked. In the disclosed embodiment, the first portion 24 of housing 10 is of cylindrical shape. The second or forward portion 26 of the housing 10 is sized and shaped to cover the aperture to be blocked. Thus, the junction between the portions 24 and 26 of housing 10 defines a contact surface or shoulder 28 (see FIG. 2) which engages, in the example being described, the front face of the bumper of a motor vehicle about the periphery of the access aperture to be blocked. In the interest of avoiding marring of the bumper surface, plastic pads 30 of the appropriate size and shape may be adhesively secured to shoulder 28. The plastic pads 30 may be provided on a sheet 32 which defines a plurality of such pads and the user will select those pads which are appropriate for the particular installation.

The forward portion 26 of housing 10, in the disclosed embodiment, has an elliptical shape when viewed in cross-section and tapers inwardly from shoulder 28 toward the end of the housing which circumscribes the entrance end of the keyway to the front end of the housing. The tapered forward portion 26 of housing 10 defines the axis of the housing and, as noted, the cylinder lock 12 is supported within the housing so that the axis of rotation of plug 16 is coaxial with the housing axis. The axis of cylindrical rear portion 24 of housing 10 is eccentrically oriented with respect to the axis of plug rotation, i.e., the axis of the cylindrical first portion 24 is parallel to but offset from axis of rotation 17.

Plug 16 has a threaded coaxial extension 34 which is provided with a pair of flats on opposite sides thereof. With the lock 12 installed in housing 10, extension 34 will project outwardly beyond the rear end of housing 10 as defined by portion 24. The cam blade 20 is received on extension 34 and, because of the cooperating shapes of the aperture in blade 20 and extension 34, the cam blade will rotate with plug 16. The blade is captured on extension 34 by means of a cone nut 36. Proper axial spacing of blade 20 from housing 10 is obtained by the use of a spacer 38 which fits over extension 34.

The forwardly facing surface of cam blade 20 will engage the rear surface of the bumper. In the installed state of the lock, this engagement will be established at opposite sides of the access opening to be blocked. In the disclosed embodiment, the width of cam blade 20 is greater than 50% of the diameter of the rear portion 24 of housing 10. Cam blade 20 extends transversely with respect to the axis of rotation 17 of plug 16 with the degree of extension being different on the two opposite sides of the axis of rotation. Restated, cam blade 20 is also eccentrically mounted relative to axis of rotation 17. The length of the shorter of these two cam blade extension distances, i.e., the distance measured from the axis of rotation to the closest end of blade 20, will be substantially equal to the radius of the rear portion 24 of housing 10.

Figure 4A:
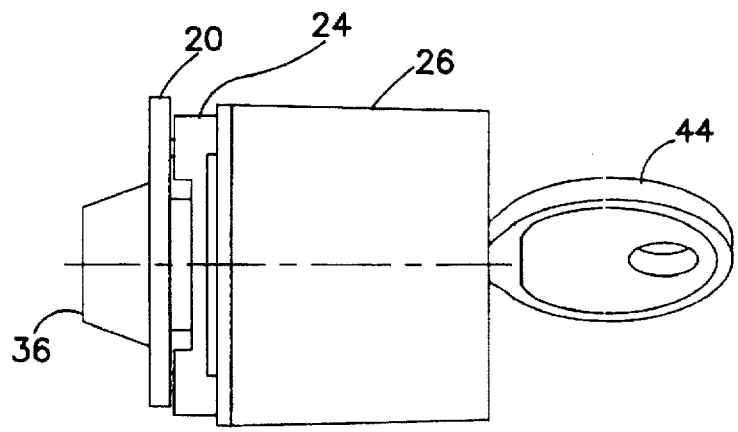
FIGS. 4A, 4B and 4C are views respectively similar to FIGS. 3A, 3B and 3C depicting normal operation of the lock during installation thereof, FIG. 4 depicting the lock intermediate the unlocked and locked states.
Figure 4B:
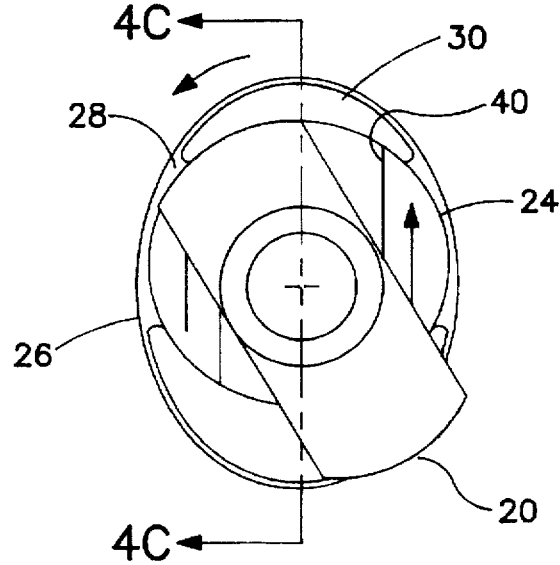

The rear end of housing portion 24 is provided with a slot 40, best seen in FIG. 4b, having a width and depth commensurate with the dimensions of blade 20. Also, the opposite ends of blade 20 are shaped so as to be arcs of circles having the same radius as housing portion 24.

When the disclosed embodiment of the present invention is in the installed condition, i.e., when the device is secured in an access aperture, the front of cylinder lock 12 will be recessed in housing 10. In order to protect the cylinder lock 12 from particulate contamination, a snap-in protective cap 42 is provided.

Figure 3B:
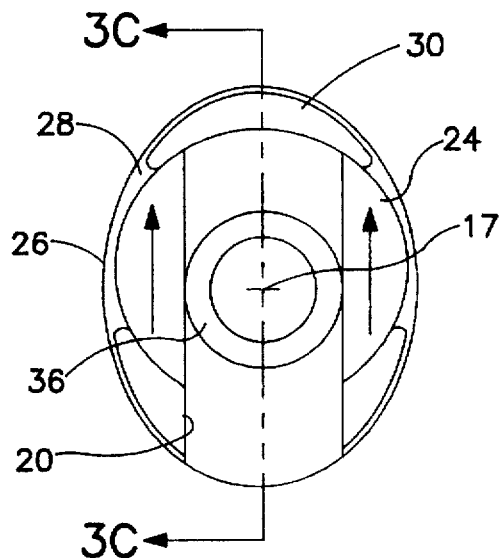
Figure 3C:
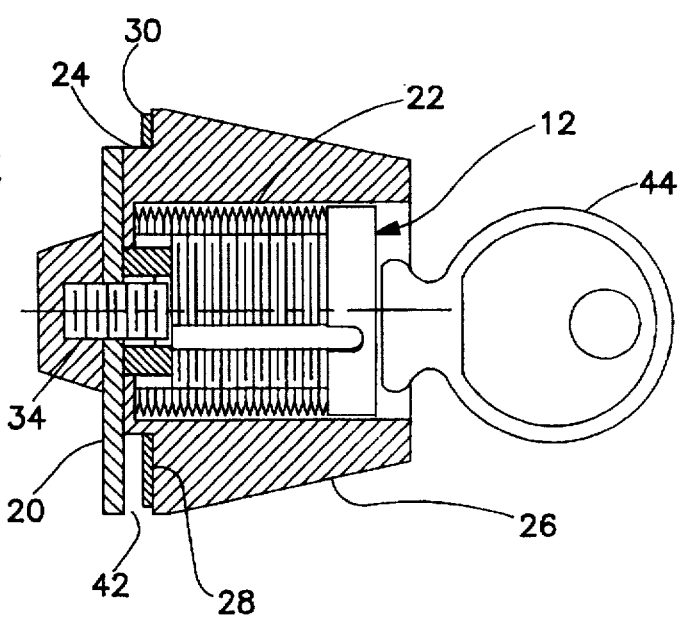
Figure 4C:
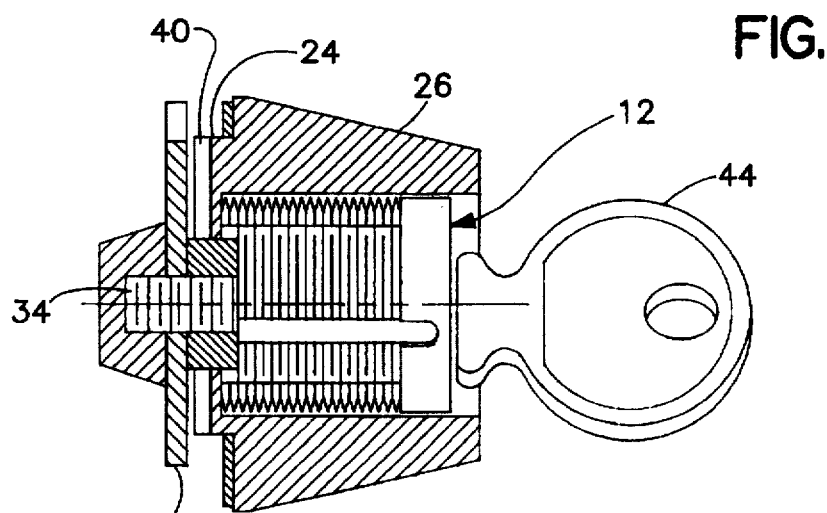
Figure 5A:
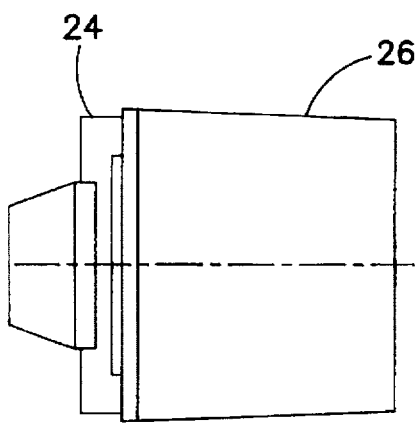
FIGS. 5A, 5B and 5C are views respectively similar to FIGS. 3A, 3B and 3C, FIG. 5 showing the lock in the locked state with the key removed.
Figure 5B:
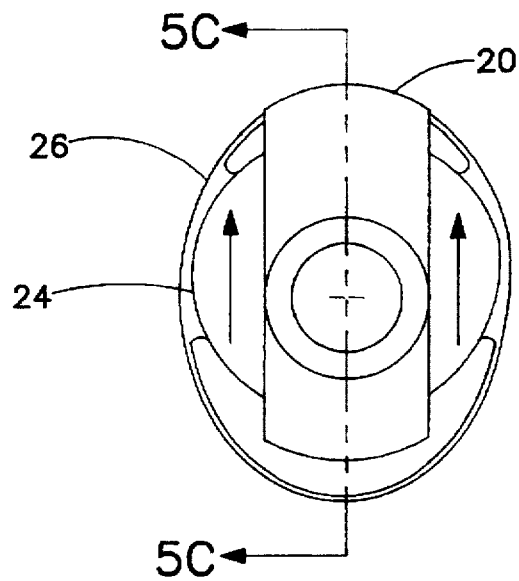
Figure 5C:
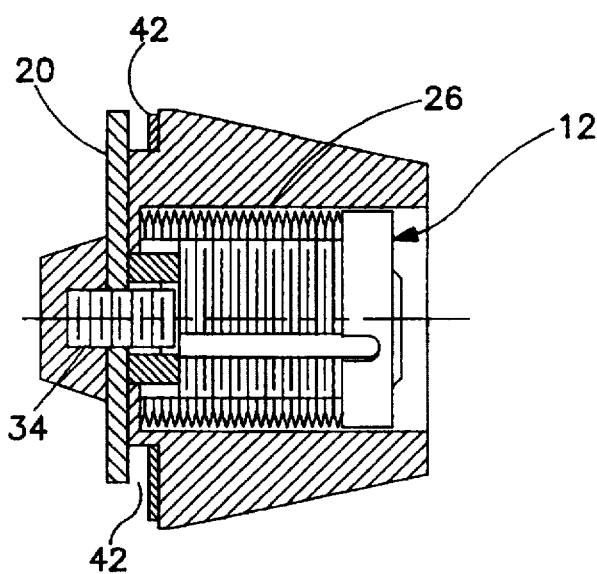

The above-described bumper lock is depicted in the locked state in FIGS. 2 and 5 and in the unlocked state in FIG. 3. In both states, the cam blade 20 is received in slot 40 in rear portion 24 of housing 10. As may be seen from FIG. 3, the first or shorter end of blade 20 is substantially in alignment with the periphery of housing portion 24 with the lock in the unlocked, i.e., the installation, state. In this state, the longer end of blade 20 extends outwardly beyond the edge of housing portion 24 and a gap 42 is thus defined between contact shoulder 28 and the opposite, facing surface of blade 20. To install the bumper lock, the device is inserted at an angle so as to cause the bumper to be engaged in the gap 42. Thereafter, the lock is angularly repositioned so that the axis of rotation of plug 16 is horizontal. Thereafter, using a properly bitted key 44, the cylinder lock is urged inwardly against the bias of springs 22 to disengage blade 20 from slot 40 and plug 16 may be rotated as depicted in FIG. 4. During this rotation, blade 20 will slide on the end of housing portion 24.

When the plug 16 has been rotated through an angle of 180°, realignment between the blade 20 and the slot 40 in housing portion 24 will be reestablished. This is the "locked" state as depicted in FIGS. 2 and 5. A pair of oppositely disposed bumper receiving gaps 42, 42' are established in this locked state, i.e., the blade 20 will extend beyond the edge of housing portion 24 on both sides of the axis of rotation. Accordingly, the bumper will be captured between blade 20 and shoulder 28 in two regions displaced by 180° and the areas of contact, as defined by surface portions of blade 20, will be substantial. Thus, the lock will be securely and reliably attached to the bumper and the access opening in which the housing portion 24 is received will be effectively blocked. When the FIG. 5 state is established, the key 44 will be removed and the cover 42 snapped into position. The blade 20 will, of course, at this time be located in the slot 40.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Locking apparatus for selectively blocking access to an aperture which extends through a mechanical member, the aperture having an axis and a width and an area measured transverse to said aperture axis, the mechanical member having a thickness measured along the axis of the aperture between opposite ends of the aperture, said locking apparatus comprising:

a tubular housing, said housing having a pair of oppositely disposed ends and defining a housing axis which extends between said ends, said housing having a maximum cross-sectional area measured transverse to said housing axis which exceeds the area of the aperture to be blocked whereby said housing may engage the mechanical member about the periphery of the aperture at a first end of the aperture and thereby cover the aperture;

a key operated cylinder lock mounted within said tubular housing, said cylinder lock including a shell having a fixed rotational orientation relative to said housing and a plug which is rotatable within and relative to said shell about an axis of rotation which is oriented generally parallel to said housing axis, said shell and plug having cooperating pin tumblers for selectively enabling or preventing relative rotation between said shell and plug, said plug having oppositely disposed first and second ends and a keyway which extends from said plug first end, said plug further having an axial extension at said second end thereof, said keyway being accessible via a first of said housing oppositely disposed ends, said plug axial extension projecting beyond said second of said housing ends, said cylinder lock being supported within said housing for limited motion in a direction parallel to said housing axis, relative rotation between said shell and plug being enabled by insertion of a properly bitted key in said keyway;

means disposed in said housing for resiliently biasing said cylinder lock toward said first end of said housing; and a retaining cam affixed to said plug axial extension, said cam having a blade mounted for rotation with said plug, said blade having a mechanical member engaging first face which is oriented generally transversely with respect to said axis of rotation, said blade having a length measured transversely with respect to said axis of rotation which exceeds the width of the aperture to be blocked, said blade being displaced from said housing maximum cross-section by a distance which exceeds the thickness of the mechanical member having the aperture to be blocked, said blade extending unequal distances from said axis of plug rotation in a pair of opposite directions, said first face of said blade engaging the apertured mechanical member at the second end of the aperture in a pair of oppositely disposed angularly displaced regions whereby the mechanical member is captured between said housing means and said blade.

2. The apparatus of claim 1 wherein said housing at least in part has a stepped exterior configuration, a first portion of said stepped exterior configuration extending from said housing second end and having a size and shape which permits insertion thereof into the aperture to be blocked, said housing first portion terminating at a point along said housing axis where the cross-sectional area of said housing exceeds the area of the aperture to be blocked, said termination of said housing first portion defining a shoulder oriented generally transversely to said housing axis, said shoulder engaging the mechanical member at the first end of the aperture to be blocked.

3. The apparatus of claim 2 wherein said housing first portion is eccentrically oriented relative to said axis of plug rotation and wherein said blade extends transversely beyond said housing first portion only in a first direction in an unlocked state of said cylinder lock and said blade extends transversely beyond said housing first portion in both of said opposite directions in the locked state of said cylinder lock.

4. The apparatus of claim 3 wherein said cam blade slides on the end of said housing first portion during rotation of said blade.

5. The apparatus of claim 3 wherein said housing second end is defined by said housing first portion and is provided with a slot for receiving and engaging said cam blade in the locked and unlocked states of said cylinder lock, said blade being disengaged from said slot by imparting movement to said cylinder against the bias of said biasing means.

6. The apparatus of claim 3 wherein said shoulder is located where said maximum cross-sectional area of said housing is measured and wherein the exterior configuration of said housing includes a second portion which smoothly tapers in the direction of said housing axis from said shoulder to said housing first end.

7. The apparatus of claim 3 wherein said cylinder lock plug is coaxial with said housing and wherein said plug first end is axially displaced from said housing first end in the direction of said housing second end to thereby define a recess at said first end of said housing.

8. The apparatus of claim 7 further comprising:

a cover removably received in said recess.

9. The apparatus of claim 3 wherein said biasing means comprises:

a pair of compression springs extending between said housing and said cylinder lock.

10. The apparatus of claim 3 wherein said housing first portion has a circular cross-section and wherein at least one end of said cam blade has an arcuate shape with the same radius as said housing first portion.

11. The apparatus of claim 10 wherein said housing second portion has a non-circular cross-section.

12. The apparatus of claim 11 wherein said shoulder is axially located where said maximum cross-sectional area of said housing is measured and wherein the exterior configuration of said housing second portion smoothly tapers from said shoulder to said housing first end.

13. The apparatus of claim 5 wherein said housing first portion has a circular cross-section and wherein at least a first end of said cam blade has an arcuate shape, the radius of said housing first portion being substantially the same as the radius of said arcuately shaped blade first end.

\* \* \* \* \*